United States Patent [19]

Moore

[11] Patent Number: 4,717,962
[45] Date of Patent: Jan. 5, 1988

[54] METHOD FOR COMPRESSING AND RECONSTRUCTING A DATA REPRESENTATION OF A PICTURE

[75] Inventor: John F. Moore, Lake Bluff, Ill.

[73] Assignee: Kabushiki Kaisha Toshiba, Kawasaki, Japan

[21] Appl. No.: 942,691

[22] Filed: Dec. 17, 1986

[51] Int. Cl.$^4$ ............................................ H04N 1/415
[52] U.S. Cl. .................................................. 358/260
[58] Field of Search ............... 358/260, 261, 133, 134, 358/135

[56] References Cited

U.S. PATENT DOCUMENTS

| 4,150,401 | 4/1979 | Yamamoto | 358/260 |
| 4,365,273 | 12/1982 | Yamada | 358/260 |
| 4,598,372 | 7/1986 | McRoberts | 358/133 |
| 4,642,698 | 2/1987 | Yamada | 358/260 |

OTHER PUBLICATIONS

Block-Overlap Transform Coding of Image Signals, M. Schlichte, Siemens AG, Zentrallaboratorium fur Nachrichten- und Sicherungstechnik, pp. 100-104.
Piecewise Fourier Transformer for Picture Bandwidth Compression, Anderson et al., IEEE Trans. of Communication Tech., vol. COM-19, No. 2, Apr. 1971, pp. 133-140.
Reduction of Blocking Effects in Image Coding, Reeve et al., Optical Engineering, vol. 23, No. 1 (Jan., Feb. 1984), pp. 034-037.
Digital Picture Processing, Rosenfeld et al., Academic Press, 2nd Edition, vol. 1, pp. 155-160.
Block Overlapping Transformation Coding—Theory and Numerical Simulation Using Image Signals, Marschall et al., Siemens Forsch.u.Entwickl., vol. 13, No. 3, pp. 1-10.
Transform Coding of Images Using Interleaved Blocks, Person et al., IEE Proceed., vol. 131, PT.F., No. 5, Aug. 1984, pp. 466-472.
An Image Transform Coding Scheme Based on Spatial Domain Considerations, Chen et al., IEEE Transactions on Pattern Analysis and Machine Intelligence, vol. PAMI-5, No. 3, May 1983, pp. 332-337.
The Measurement of Power Spectra, Blackman et al., Dover Publications, Inc., New York, pp. 9-179.
The FET Fundamentals and Concepts, Ramirez, Prentice-Hall, Inc., pp. 102-145.

*Primary Examiner*—Tommy P. Chin
*Attorney, Agent, or Firm*—Finnegan, Henderson, Farabow, Garrett & Dunner

[57] ABSTRACT

A method for compressing and reconstructing original picture data representative of a plurality of pixels. The method includes a partitioning step and a weighting step. In the partitioning step, the original picture data is partitioned into a plurality of input blocks, with each such input block comprising data representative of border pixels shared with adjacent input blocks and unshared interior pixels surrounded by the border pixels. In the weighting step, data representative of the border pixels is weighted in order to reduce distortions of the original picture data caused by subsequent steps of such method.

6 Claims, 9 Drawing Figures

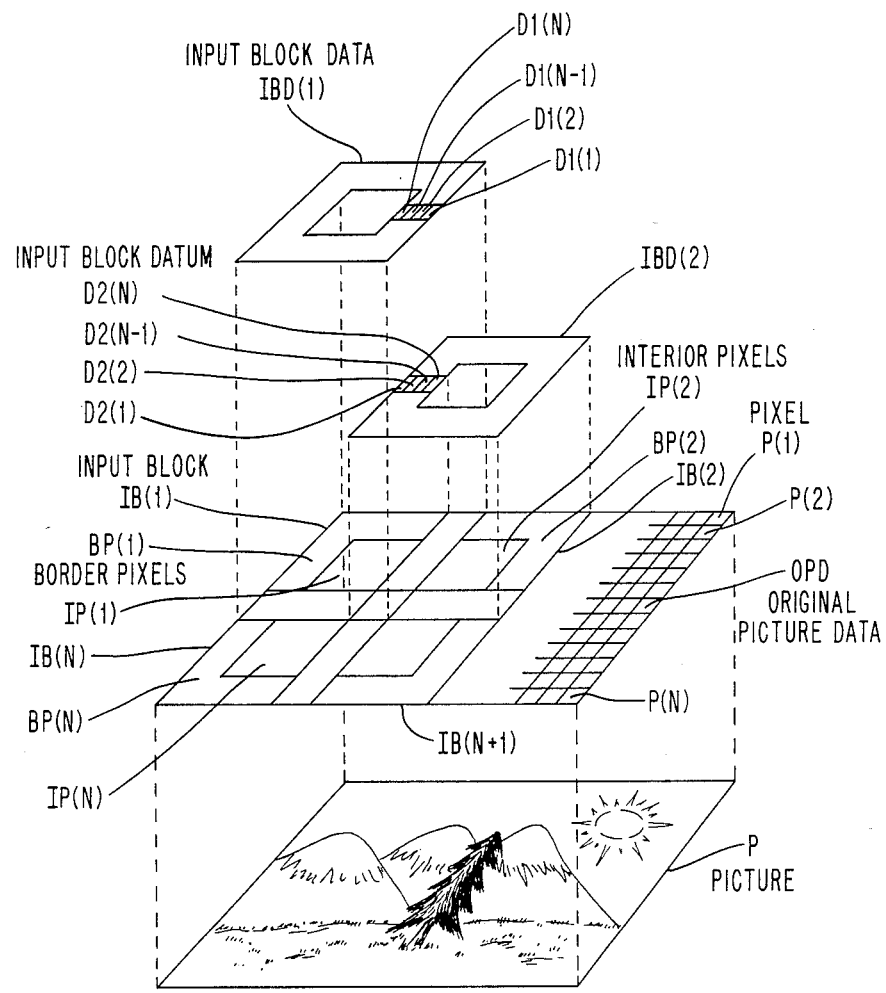

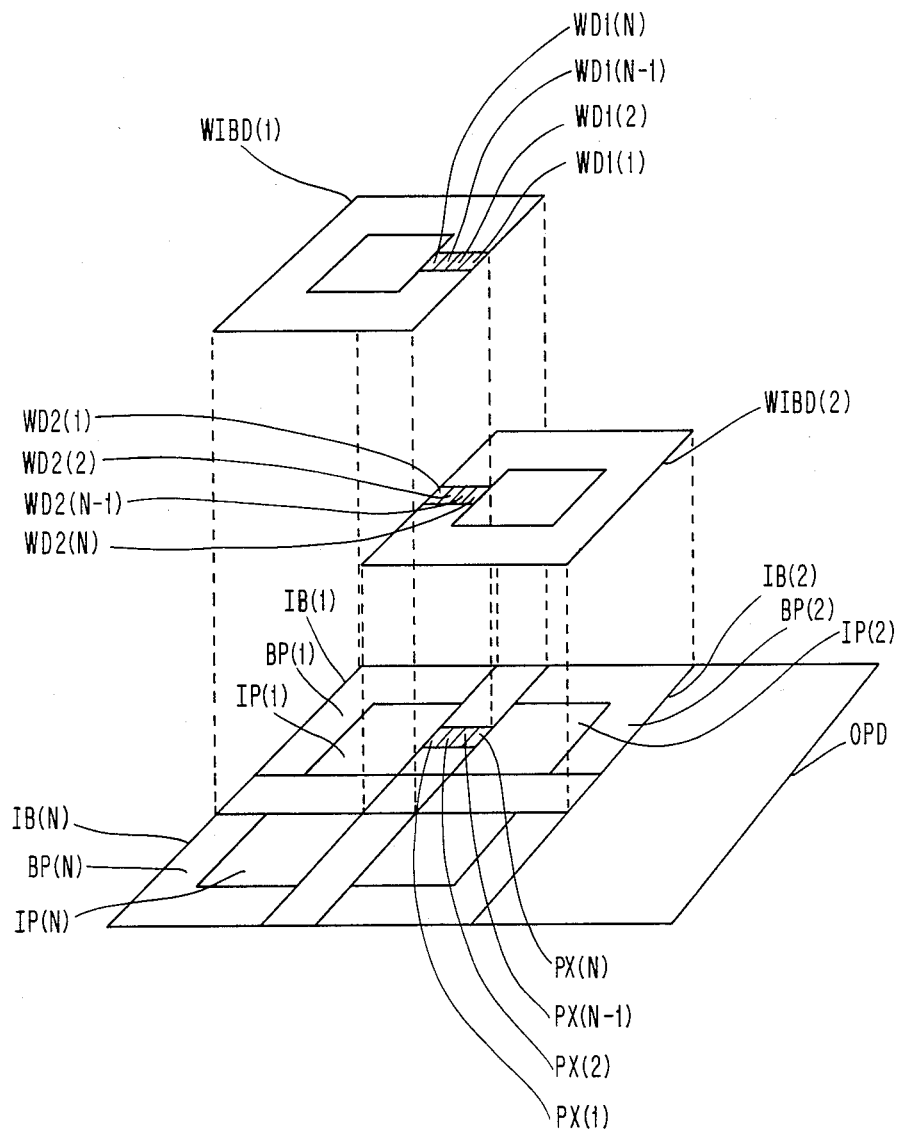

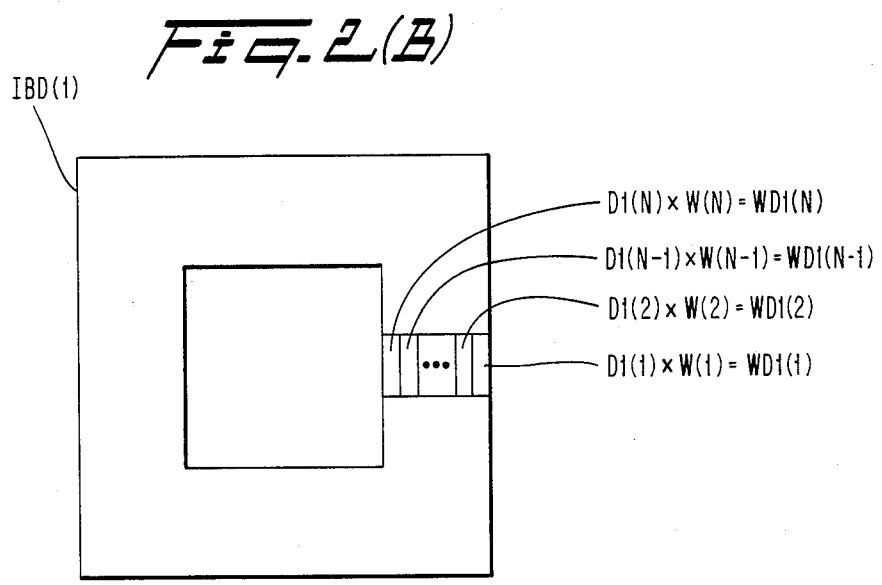
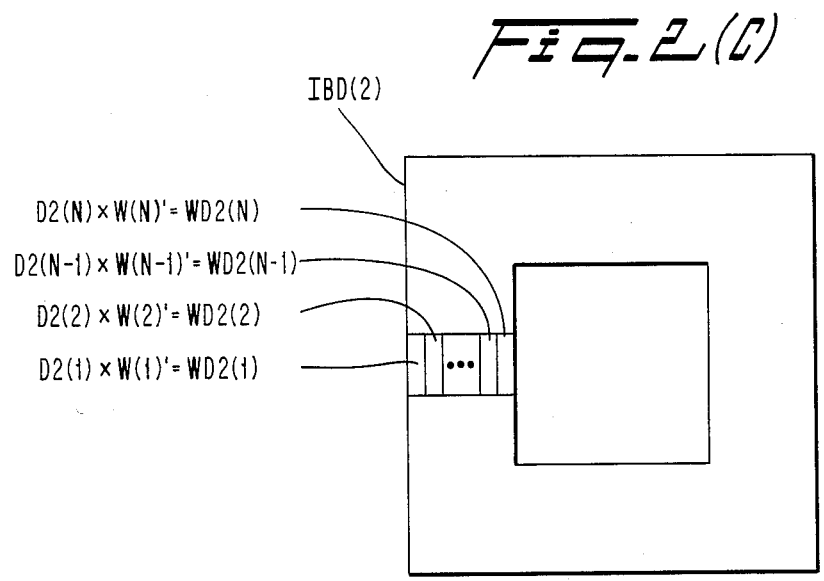

Fig. 3

| .25 | .5 | .5 | .5 | .5 | .5 | .5 | .5 | .5 | .5 | .25 |
|---|---|---|---|---|---|---|---|---|---|---|
| .5 |   |   |   |   |   |   |   |   |   | .5 |
| .5 |   |   |   |   |   |   |   |   |   | .5 |
| .5 |   |   |   |   |   |   |   |   |   | .5 |
| .5 |   |   |   |   |   |   |   |   |   | .5 |
| .5 |   |   |   |   |   |   |   |   |   | .5 |
| .5 |   |   |   |   |   |   |   |   |   | .5 |
| .5 |   |   |   |   |   |   |   |   |   | .5 |
| .5 |   |   |   |   |   |   |   |   |   | .5 |
| .5 |   |   |   |   |   |   |   |   |   | .5 |
| .25 | .5 | .5 | .5 | .5 | .5 | .5 | .5 | .5 | .5 | .25 |

Fig. 4

| .09 | .21 | .30 | .30 | .30 | .30 | .30 | .30 | .30 | .21 | .09 |
|---|---|---|---|---|---|---|---|---|---|---|
| .21 | .49 | .70 | .70 | .70 | .70 | .70 | .70 | .70 | .49 | .21 |
| .30 | .70 |   |   |   |   |   |   |   | .70 | .30 |
| .30 | .70 |   |   |   |   |   |   |   | .70 | .30 |
| .30 | .70 |   |   |   |   |   |   |   | .70 | .30 |
| .30 | .70 |   |   |   |   |   |   |   | .70 | .30 |
| .30 | .70 |   |   |   |   |   |   |   | .70 | .30 |
| .30 | .70 |   |   |   |   |   |   |   | .70 | .30 |
| .30 | .70 |   |   |   |   |   |   |   | .70 | .30 |
| .21 | .49 | .70 | .70 | .70 | .70 | .70 | .70 | .70 | .49 | .21 |
| .09 | .21 | .30 | .30 | .30 | .30 | .30 | .30 | .30 | .21 | .09 |

Fig. 5

| .05 | .11 | .17 | .22 | .22 | .22 | .22 | .22 | .22 | .22 | .17 | .11 | .05 |
|---|---|---|---|---|---|---|---|---|---|---|---|---|
| .11 | .25 | .39 | .50 | .50 | .50 | .50 | .50 | .50 | .50 | .39 | .25 | .11 |
| .17 | .39 | .61 | .78 | .78 | .78 | .78 | .78 | .78 | .78 | .61 | .39 | .17 |
| .22 | .50 | .78 |   |   |   |   |   |   |   | .78 | .50 | .22 |
| .22 | .50 | .78 |   |   |   |   |   |   |   | .78 | .50 | .22 |
| .22 | .50 | .78 |   |   |   |   |   |   |   | .78 | .50 | .22 |
| .22 | .50 | .78 |   |   |   |   |   |   |   | .78 | .50 | .22 |
| .22 | .50 | .78 |   |   |   |   |   |   |   | .78 | .50 | .22 |
| .22 | .50 | .78 |   |   |   |   |   |   |   | .78 | .50 | .22 |
| .22 | .50 | .78 |   |   |   |   |   |   |   | .78 | .50 | .22 |
| .17 | .39 | .61 | .78 | .78 | .78 | .78 | .78 | .78 | .78 | .61 | .39 | .17 |
| .11 | .25 | .39 | .50 | .50 | .50 | .50 | .50 | .50 | .50 | .39 | .25 | .11 |
| .05 | .11 | .17 | .22 | .22 | .22 | .22 | .22 | .22 | .22 | .17 | .11 | .05 |

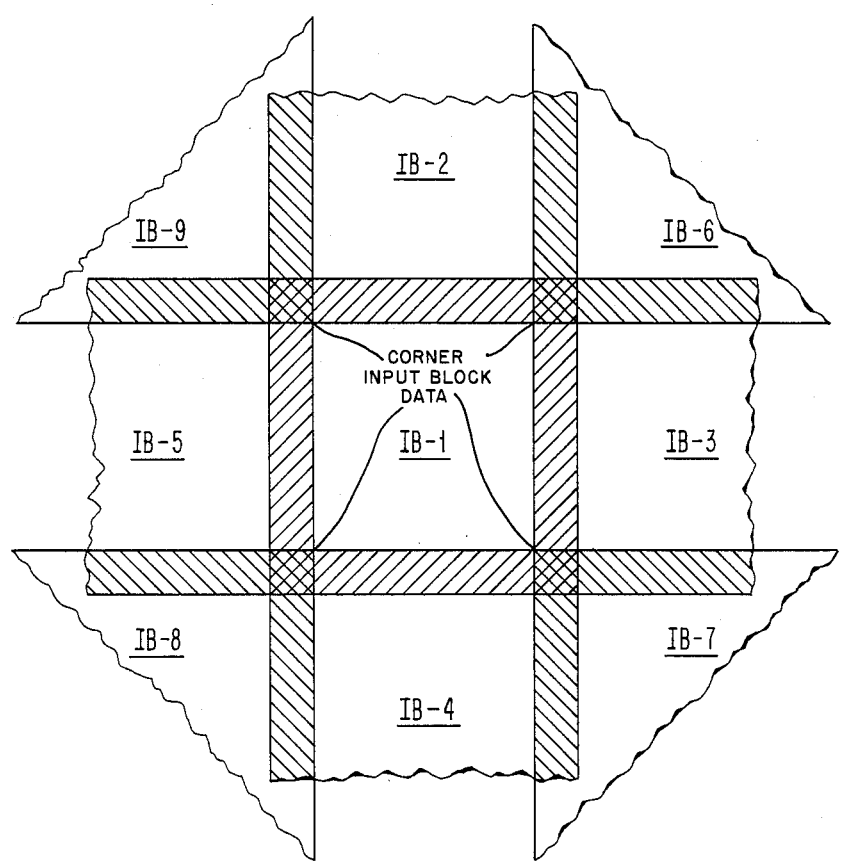

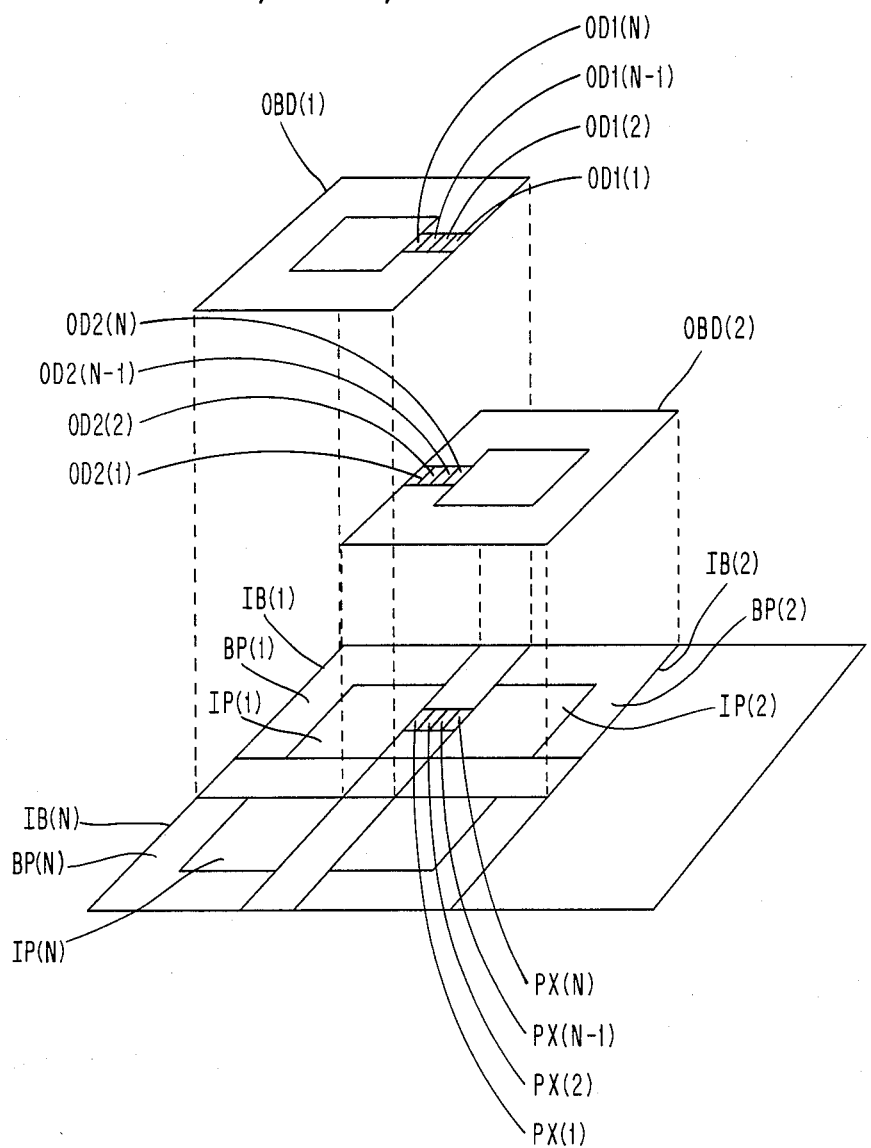

METHOD FOR COMPRESSING AND RECONSTRUCTING A DATA REPRESENTATION OF A PICTURE

BACKGROUND OF THE INVENTION

I. Field of the Invention

The present invention relates generally to a method for compressing and reconstructing a data representation of a picture, and more specifically, to a method for reducing distortions of that data caused thereby.

II. Background Information

A method for compressing and reconstructing a data representation of a picture ("original picture data") employing transform coding generally includes a partitioning step, a transform coding step, a suppressing step, a decoding step, and a combining step.

In the partitioning step, the original picture data is partitioned into a plurality of input blocks, with each such input block comprising input block data representing a border of picture elements ("pixels") and interior pixels surrounded by such border pixels. Each pixel corresponds to a location in the picture represented by the original picture data, and each pixel has a value corresponding to the brightness of the picture at that location.

In the transform coding step, the data of each input block is individually transformed to obtain transformed input block data representative of a plurality of coefficients, with each such coefficient associated with spatial frequencies inherent in the input block data.

In the suppressing step, data from the transformed input block data for each input block are suppressed to obtain compressed transformed input block data. Such suppressing occurs either by discarding data representative of certain coefficients or by assigning fewer data bits to such coefficients.

The compressed transformed input block data for each input block is transmitted or stored, and subsequently either received or accessed.

In the decoding step, the compressed transformed input block data for each input block is inversely transformed to obtain output block data for each input block.

In the combining step, the output block data for adjacent input blocks is juxtaposed to obtain reconstructed picture data representative of the original picture data.

The quality of the picture represented by the reconstructed picture data depends on faithfully reproducing input block data of each input block which represents the original picture data and discarding data in the suppressing step representing only those coefficients, or assigning fewer data bits to such coefficients, which contribute least to such faithful reproduction. Coefficients associated with high frequencies ("high frequency coefficients") contribute least to the faithful reproduction of input block data of an input block as a whole, and are usually discarded, or assigned fewer data bits, although such coefficients contribute most to the faithful reproduction of input block data representing border pixels of that block.

As a result, input block data representative of border pixels of an input block is distorted by such disarding or assigning. Such distortions are reflected in the corresponding output block data. When output block data for adjacent input blocks is juxtaposed in the combining step, these distortions form discontinuous jumps in pixel values where output block data for such input blocks is juxtaposed, which in turn cause discontinuous jumps in brightness in the resultant picture represented by such juxtaposition of output block data. Such jumps in brightness are highly visible since the human eye is extremely sensitive to such discontinuous jumps, particularly when they form a straight line as is the case for block borders.

Several compressing and reconstructing methods have been advanced to reduce these discontinuous pixel value jumps and, incidentally, the discontinuous brightness jumps caused thereby. The first such method, windowing, includes a partitioning step, and immediately thereafter, a weighting step.

In the partitioning step, the original picture data is partitioned into a plurality of overlapping input blocks, with each such input block comprising input block data representative of pixels shared with adjacent input blocks.

In the weighting step, input block data representative of all pixels of an input block are weighted prior to transform coding such input block data. This weighting improves reproduction of the input block data by reducing the effect of suppressing transformed input block data in a subsequent conventional suppressing step. However, a problem with windowing is that input block data representing all pixels of an input block are weighted, and extensive and repetitive overlapping of the input blocks occurs.

Such weighting and overlapping encumber windowing with a substantial amount of computational overhead due to the repetitive transform coding and decoding of data representing pixels shared between adjacent input blocks ("overhead pixels") caused thereby. For example, M. Schlichte in *Block-Overlap Transform Coding of Image Signals*, Siemens Research and Dev. Rep., vol. 13, No. 3 (1984), teaches windowing with overlapping input blocks, where every pixel of each such block is shared with three adjacent input blocks, so that data representative of three times as many pixels as are represented by the original picture data are transform coded and decoded.

A compressing and reconstructing method which is not so encumbered is linear interpolation which, as described by G. Anderson and T. Huang in *Piecewise Fourier Transformation for Picture Bandwidth Compression*, IEEE Transactions on Com. Technology, vol. COM-19, No. 2 (April 1971), adds one row and one column of new pixels to each input block before transform coding the input block data of such block, with such new pixels having values representative of linear interpolations between the values of border pixels located on opposite sides of the input blocks ("linearly interpolated overhead pixels").

Linear interpolation is, however, of extremely limited applicability, since linear interpolation requires that the Discrete Fourier Transform ("DFT") be employed to transform the data of each input block during the transform coding step, and the DFT is not generally considered to be the optimum type transform. In addition, in many cases, even when the DFT is employed, adding only one row and one column of new linearly interpolated overhead pixels to each input block in the partitioning step will not reduce distortion of the data representative of the border pixels of a block to the extent required to eliminate visible discontinuous brightness jumps in the resultant picture.

A compressing and reconstructing method which envisages using more than one extra row and one column of overhead pixels with each input block is called averaging. In averaging, as described by H. Reeve and J. Lim in *Reduction of Blocking Effects in Image Coding*, Optical Engineering, vol. 23, No. 1 (Jan./Feb. 1984), the overhead pixels are not new pixels, but pixels shared between adjacent input blocks, and data representative of such pixels are averaged in the combining step. As a result, data representative of such pixels is distorted in the suppressing step, such distortions being only partially overcome by the averaging, resulting in visible discontinuous brightness jumps remaining in the resultant picture.

Accordingly, an object of the present invention is to provide a method for compressing and reconstructing original picture data which reduces discontinuous brightness jumps in the resultant picture represented by such data, but which has low computational overhead and which has wide applicability.

Additional objects and advantages of the invention will be set forth in the description which follows or may be learned by practice of the invention.

SUMMARY OF THE INVENTION

To achieve the foregoing objects, and in accordance with the purpose of the invention as embodied and broadly described herein, there is provided a method for compressing and reconstructing a data representation of a picture ("original picture data") comprising a plurality of picture elements ("pixels"), with each of the pixels corresponding to a location in the picture, and with each of the pixels having a value corresponding to the brightness of the picture at that location, comprising the steps of: (a) partitioning the original picture data into a plurality of incompletely overlapping input blocks, with each of the input blocks comprising input block data representative of border pixels shared with adjacent input blocks and unshared interior pixels surrounded by the border pixels; (b) weighting for each input block the input block data representing the border pixels while leaving the input block data representative of the unshared interior pixels unweighted to obtain weighted input block data for each input block; (c) transforming for each input block the weighted input block data to obtain transformed weighted input block data, and suppressing data from the transformed weighted input block data to obtain compressed transformed weighted input block data for each input block; (d) decoding the compressed transformed weighted input block data to obtain output block data corresponding to the border pixels and the unshared interior pixels of corresponding input blocks; (e) assembling the output block data according to the position of the corresponding input blocks in the original picture data while overlapping the output block data to the extent such data corresponds to border pixels of the corresponding input blocks to obtain overlapping output block data; and (f) summing all overlapping output block datum corresponding to a particular border pixel to obtain reconstructed picture data representative of the pixel while leaving the output block data corresponding to unshared interior pixels unchanged to obtain reconstructed picture data representative of the unshared interior pixels.

BRIEF DESCRIPTION OF THE DRAWINGS

FIG. 1 is an illustration of original picture data being partitioned according to the teachings of the subject invention;

FIGS. 2(A), 2(B) and 2(C) are illustrations of input block data being weighted according to the teachings of the subject invention;

FIG. 3 shows weights according to a preferred embodiment of the subject invention for one row and one column of border pixels;

FIG. 4 shows an example of weights for two rows and two columns of border pixels;

FIG. 5 shows an example of weights for three rows and three columns of border pixels;

FIG. 6 is an illustration of input block datum being assembled and summed according to the teachings of the subject invention.

DESCRIPTION OF THE PREFERRED EMBODIMENT

The method of the subject invention comprises a partitioning step, a weighting step, a transform coding step, a decoding step, an assembling step, and a summing step.

FIG. 1 depicts original picture data OPD representative of a picture P and comprising pixels P(1), P(2) . . . P(N), partitioned into a plurality of incompletely overlapping input blocks IB(1), IB(2) . . . IB(N).

Each of the input blocks comprises input block data representative of border pixels shared with adjacent input blocks and unshared interior pixels surrounded by the border pixels. For example, with reference to FIG. 1, input block IB(1) comprises input block data IBD(1) representative of border pixels BP(1) shared with adjacent input blocks IB(2) and IB(N) and (at the corner) with IB(N+1), and unshared interior pixels IP(1) surrounded by the border pixels BP(1); input block IB(2) comprises input block data IBD(2) representative of border pixels BP(2) shared with adjacent input blocks IB(1), IB(N), and IB(N+1) (and with other adjacent input blocks not shown in FIG. 1), and unshared interior pixels IP(2) surrounded by the border pixels BP(2); and input block IB(N) comprises input block data IBD(N) (not shown) representative of border pixels BP(N) shared with input blocks IB(1), IB(2), and IB(N+1) (and other adjacent input blocks not shown in FIG. 1), and unshared interior pixels IP(N) surrounded by the border pixels BP(N).

In a preferred embodiment of the subject invention, the input block data of each input block representative of the unshared interior pixels of such block comprise at least approximately 50 percent of the input block data representative of all the pixels of such block. For example, with reference to FIG. 1, input block data representative of the interior pixels IP(1) of input block IB(1) comprise at least approximately 50 percent of the input block data IBD(1); input block data representative of the interior pixels IP(2) of input block IR(2) comprise at least approximately 50 percent of the input block data IBD(2); and input block data representative of the interior pixels IP(N) of input block IB(N) comprise at least approximately 50 percent of the input block data IBD(N) (not shown).

In a second preferred embodiment of the subject invention, the input block data of each input block representative of the unshared interior pixels of such block comprise at least approximately 80 percent of the input block data representative of all the pixels of such block.

In a third most preferred embodiment of the subject invention, the input block data of each input block representative of the unshared interior pixels of such block comprise at least approximately 90 percent of the input block data representative of all the pixels of such block.

The input block data of each input block representative of the border pixels of such block is weighted in the weighting step of the subject invention while the remaining input block data representative of the unshared interior pixels is left unweighted (by which it is meant that each unshared interior pixel is given a weight of "1") in such step to obtain weighted input block data for each input block. For example, with reference to FIG. 2(A), input block data for input block IB(1) representative of the border pixels BP(1) of such block is weighted while the input block data for input block IB(1) representative of the unshared interior pixels IP(1) of such block is left unweighted to obtain weighted input block data WIBD(1) for input block IB(1); input block data for input block IB(2) representativeof the border pixels BP(2) of such block is weighted while the input block data for input block IB(2) representative of the unshared interior pixels IP(2) of such block is left unweighted to obtain weighted input block data WIBD(2) for input block IB(2); and input block data for input block IB(N) representative of the border pixels BP(N) of such block is weighted while the input block data for input block IB(N) representative of the unshared interior pixels IP(N) of such block is left unweighted to obtain weighted input block data WIBD(N) (not shown) for input block IB(N).

Such data is preferably weighted by assigning a weight to each unweighted input block datum representative of a border pixel to obtain a weighted input block datum corresponding to that pixel. The assigned weights are such that the sum of all the weighted datum corresponding to a particular border pixel from all the input blocks equals the unweighted datum representative of that pixel; namely, such that the sum oif all the weights assigned to unweighted input block datum representative of a particular border pixel from all the input blocks equals "1".

Specifically, as shown in FIGS. 2(B) and 2(C), weights having values $W(N)$, $W(N-1) \ldots W(2)$, $W(1)$ are assigned to unweighted input block datum $D1(N)$ $D1(N-1)\ldots, D1(2), D1(1)$ respectively of input block data IBD(1) representative of border pixels PX(1), PX(2) ... PX(N−1), PX(N), respectively, (FIG. 2(A)) to obtain weighted input block datum $WD1(N)$, $WD1(N-1) \ldots WD1(2), WD1(1)$, respectively; and weights having the values $W(1)'$, $W(2)' \ldots W(N-1)'$, $W(N)'$ are assigned to unweighted input block datum $D2(1), D2(2), \ldots D2(N-1), D2(N)$, respectively, of input block data IBD(2) which are also representative of border pixels PX(1), PX(2) ... PX(N−1), PX(N), respectively, to obtain weighted input block datum $WD2(1), WD2(2) \ldots WD2(N-1), WD2(N)$, respectively.

Such weighted input block datum is obtained by multiplying each unweighted input block datum of each input block representative of a border pixel of such input block with the value of the weight assigned to such datum. Thus, with reference to FIG. 2(B), weighted input block datum $WD1(N), WD1(N-1) \ldots WD1(2), WD1(1)$ of input block data IBD(1) is obtained by multiplying unweighted input block datum $D1(N), D1(N-1) \ldots D1(2), D1(1)$ of input block data IBD(1) representative of border pixels PX(1), PX(2) ... PX(N−1), PX(N), respectively, by weights having values $W(N), W(N-1), \ldots W(2), W(1)$, respectively, assigned to such datum; and weighted input block datum $WD2(1), WD2(2) \ldots WD2(N-1), WD2(N)$ of input block data IBD(2) is obtained by multiplying unweighted input block datum $D2(1), D2(2) \ldots D2(N-1), D2(N)$ of input block data IBD(2) representative of border pixels PX(1), PX(2) ... PX(N−1), PX(N), respectively, by weights having values $W(1)'$, $W(2)' \ldots W(N-1)'$, $W(N)'$, respectively, assigned to such datum. The assigned weights having values $W(1)$, $W(2) \ldots W(N-1)$, $W(N)$ and $W(1)'$, $W(2)' \ldots W(N-1)'$, $W(N)'$ are such that weighted input block datum $WD1(N)$ and $WD2(1)$ sum to unweighted input block datum $D1(N)$ or $D2(1)$ (which both represent PX(1)); weighted input block datum $WD1(N-1)$ and $WD2(2)$ sum to unweighted input block datum $D1(N-1)$ or $D2(2)$ (which both represent PX(2)); weighted input block datum $WD1(2)$ and $WD2(N-1)$ sum to input block datum $D1(2)$ or $D2(N)$ (which both represent PX(N−1)); weighted input block datum $WD1(1)$ and $WD2(N)$ sum to unweighted input block datum $D1(1)$ or $D2(N)$ (which both represent PX(N)); namely, $W(1)$ and $W(N)'$ sum to "1"; $W(2)$ and $W(N-1)'$ sum to "1"; $W(N-1)$ and $W(2)'$ sum to "1"; and $W(N)$ and $W(1)'$ sum to "1." Preferably, $W(1)=W(1)'$; $W(2)=W(2)'$; $W(N-1)=W(N-1)'$; and $W(N)=W(N)'$.

In accordance with the above, the weights for one row and one column of border pixels in a preferred embodiment of the subject invention are shown in FIG. 3. Weights for two rows and two columns of border pixels are shown in FIG. 4, and weights for three rows and three columns of border pixels are shown in FIG. 5.

In preferred embodiments and as shown in FIGS. 3-5, weights which are assigned to input block datum representative of border pixels located at the corners of an input block are smaller in magnitude than the weights which are assigned to input block datum representative of border pixels located at other than the corners of such input block to account for the greater extent to which the datum representative of such corner pixels is shared between adjacent input blocks. The greater degree to which such corner pixels are shared is illustrated in FIG. 6, wherein input block datum representative of a particular border pixel located other than at the corners of an input block (shown shaded in FIG. 6) are, except at the borders of the original picture data, common to two input blocks (such as between input blocks IB(1) and IB(2), or between input blocks IB(1) and IB(4) of FIG. 6). Similarly, the input block datum representative of a particular border pixel located at the corners of such input block (shown hatched in FIG. 6) are, except at the borders of the original picture data, common to four input blocks (such as input blocks IB(1), IB(2), IB(5) and IB(9) of FIG. 6).

As noted above, in such preferred embodiments and as shown in FIGS. 3-5, weights assigned to input block datum representative of a particular border pixel, whether located at the corners of such input block or not, sum to "1". For example, with reference to FIG. 3 and regarding a preferred embodiment of the subject invention having one row and one column of border pixels, the values of the weights assigned to any two common datum representative of a particular border pixel located other than at the corners of an input block, 0.50 and 0.50, respectively, sum to "1", and the values of the weights assigned to any four common datum representative of a border pixel located at the corners of such input block, 0.25, 0.25, 0.25, and 0.25, respectively, also sum to "1".

Similarly, with reference to FIG. 4 and regarding a preferred embodiment of the subject invention having two rows and two columns of border pixels, the values of the weights assigned to any two common datum representative of a particular border pixel located other than at the corners of an input block, 0.30 and 0.70, respectively, sum to "1", and the values of the weights assigned to any four common datum representative of a particular border pixel located at the corners of such input block, 0.09, 0.21, 0.21, and 0.49, respectively, also sum to "1".

Finally, with reference to FIG. 5 and regarding a preferred embodiment of the subject invention having three rows and three columns of border pixels, the values of the weights assigned to any two common datum representative of a particular border pixel located other than at the corners of an input block, 0.22 and 0.78 respectively, or 0.50 and 0.50, respectively, also sum to "1", and the values of the weights assigned to any four common datum representative of a particular border pixel located at the corners of such input block, 0.05, 0.17, 0.17, and 0.61, respectively; 0.25, 0.25, 0.25, and 0.25, respectively; or 0.11, 0.11, 0.39, and 0.39, respectively, also sum to "1".

Furthermore, the magnitude of such weights preferably progressively increases as the location of the input block datum to which the weights are assigned becomes closer in proximity to the center of the input block of such input block datum. Thus, with reference to FIG. 2(B) and with respect to input block data IBD(1) of input block IB(1), the weight having a value W(N) assigned to input block datum D1(N) is progressively greater in magnitude than the weight having a value W(N−1) assigned to input block datum D1(N−1) which, in turn, is progressively greater in magnitude than the weight having a value W(2) assigned to input block datum D1(2), which, in turn, is progressively greater in magnitude than the smallest weight having a value W(1) assigned to the most outside input block datum D(1). Similarly, with reference to FIG. 2(C) and with respect to input block data IBD(2) of input block IB(2), the weight having a value W(N)' assigned to input block datum D2(N) is progressively greater in magnitude than the weight having a value W(N−1)' assigned to input block datum D2(N−1), which, in turn, is progressively greater in magnitude than the weight having a value W(2)' assigned to input block datum D2(2) which, in turn, is progressively greater in magnitude than the weight having a value W(1)' assigned to input block datum D2(1).

For example, with reference to FIG. 4 and regarding a preferred embodiment of the subject invention having two rows and two columns of border pixels, the weight having a value of 0.70 which is assigned to all input block datum of an input block representative of border pixels located other than at the corners of such input block and closest in proximity to the center of such input block is progressively greater in magnitude than the weight having a value of 0.30 which is assigned to all input block datum of an input block representative of border pixels located other than at the corners of such input block and furthest in proximity from the center of such input block.

Similarly, with reference to FIG. 5 and regarding a preferred embodiment of the subject invention having three rows and three columns of border pixels, the weight having a value of 0.78 which is assigned to all input block datum of an input block representative of border pixels located other than at the corners of such input block and closest in proximity to the center of such input block is progressively greater in magnitude than a weight having a value of 0.5 which is assigned to all input block datum of an input block representative of border pixels located other than at the corners of such input block and intermediate in proximity to the center of such input block and this weight of 0.5 is progressively greater in magnitude than the weight having a value of 0.22 which is assigned to all input block datum of an input block representative of border pixels located at other than the corners of such input block and furthest in proximity from the center of such input block.

Since progressive increase in magnitude reduces the extent to which the faithful reproduction of the weighted datum is affected by suppressing data bits in a subsequent compressing step of the subject invention, and hence reduces distortion of the weighted datum caused by such suppressing. Other criterion may be appropriate to reduce the extent to which the faithful reproduction of the weighted datum is affected in the subsequent suppressing step, and weights consistent with such criterion and in accordance with the objects of the subject invention are meant to be encompassed within the invention in its broader aspects.

After the weighting step is completed, the weighted input block data for each input block is transformed to obtain transformed weighted input block data using any of a variety of alternative transforms, including the DFT, the Discrete Cosine Transform, the Karhunen-Loeve Transform, and the Hadamard Transform. Data from such transformed data are then suppressed and the resultant compressed transformed weighted input block data for each input block is stored or transmitted.

Such data is subsequently accessed or received, and then decoded to obtain output block data corresponding to the border pixels and the unshared interior pixels of corresponding input blocks. Thus, with reference to FIG. 7, output block data OBD(1) corresponds to border pixels BP(1) and unshared interior pixels IP(1) of input block IB(1); output block data OBD(2) corresponds to border pixels BP(2) and unshared interior pixels IP(2) of input block IB(2); and output block data OBD(N) (not shown) corresponds to border pixels BP(N) and unshared interior pixels IP(N) of input block IB(N).

The output block data is then assembled according to the position of the corresponding input blocks in the original picture data and overlapped to the extent such data corresponds to border pixels of the corresponding input blocks to obtain overlapping output block data. Thus, with reference to FIG. 7, output block data OBD(1), OBD(2) . . . OBD(N) (not shown) for input blocks IB(1), IB(2) . . . IB(N), respectively, is assembled according to the position of input blocks IB(1), IB(2) . . . IB(N) in the original picture data OPD. Output block data OBD(1) is overlapped with output block data OBD(2) (and other output block data now shown) to the extent output block data OBD(1) corresponds to border pixels BP(1); and output block data OBD(2) is overlapped with output block data OBD(1) (and other output block data not shown) to the extent output block data OBD(2) corresponds to border pixels BP(2).

After the output block data is so assembled, all overlapping output block datum corresponding to a particular border pixel is summed to obtain reconstructed picture data representative of that pixel. Thus, with reference to FIG. 7, output block datum OD1(N) is summed with output block datum OD2(1), output block datum OD1(N−1) is summed with output block datum OD2(2), output block datum OD1(2) is summed with output block datum OD2(N−1), and output block datum OD1(1) is summed with output block datum OD2(N) to obtain reconstructed picture datum representative of pixels PX(1), PX(2), PX(N−1), and PX(N) respectively. The output block data corresponding to unshared interior pixels IP(1), IP(2), and IP(N) is left unchanged to obtain reconstructed picture data representative of such unshared interior pixels.

Additional advantages and modifications will readily occur to those skilled in the art. The invention in its broader aspects is not, therefore, limited to the specific details, representative methods, and illustrative examples shown and described. Accordingly, departures may be made from such details without departing from the spirit or scope of applicant's general inventive concept.

What is claimed is:

1. A method for compressing and reconstructing a data representation of original picture data of a picture comprising a plurality of pixels, with each of said pixels corresponding to a location in said picture, and with each of said pixels having a value corresponding to the brightness of said picture at said corresponding location, comprising the steps of:

(a) partitioning said original picture data into a plurality of incompletely overlapping input blocks, with each of said input blocks comprising input block data representatives of border pixels shared with adjacent input blocks and unshared interior pixels surrounded by said border pixels;

(b) weighting, for said each input block, said input block data representative of said border pixels while leaving said input block data representative of said unshared interior pixels unweighted to obtain weighted input block data for said each input block;

(c) transforming, for said each input block, said weighted input block data representative of both said border pixels and said interior pixels to obtain transformed weighted input block data, and suppressing data from said transformed weighted input block data to obtain compressed transformed weighted input block data for each input block;

(d) decoding said compressed transformed weighted input block data to obtain output block data corresponding to the border pixels and the unshared interior pixels of corresponding ones of said input blocks;

(e) assembling said output block data according to the location of the corresponding ones of said input blocks in said original picture data while overlapping said output block data to the extent such data corresponds to the border pixels of said corresponding ones of said input blocks to obtain overlapping output block data; and (f) summing all said overlapping output block data corresponding to a particular one of said border pixels to obtain reconstructed picture data representative of that particular pixel while leaving said output block data corresponding to said unshared interior pixels unchanged to obtain reconstructed picture data representative of said unshared interior pixels.

2. A method of claim 1 wherein said step of weighting comprises the substep of assigning for said each input block a weight to each unweighted input block data representative of a border pixel such that the weighted input block data from all said input blocks corresponding to a particular border pixel sum to the unweighted input block data from any of said input blocks representative of said particular border pixel.

3. A method of claim 2 wherein said substep of assigning comprises assigning weights to the unweighted input block data of said each input block such that the magnitude of said weights for said each input block progressively increases as the location of the unweighted input block data to which said weights are assigned becomes closer in proximity to the center of said input block.

4. A method of claim 1, 2, or 3 wherein said step of partitioning comprises the substep of overlapping said adjacent input blocks such that the input block data of said each input block representative of the unshared interior pixels of that input block comprise at least approximately 50 percent of the input block data representative of all the pixels of such block.

5. A method of claim 1, 2, or 3 wherein said step of partitioning comprises the substep of overlapping said adjacent input blocks such that the input block data of said each input block representative of the unshared interior pixels of that input block comprise at least approximately 80 percent of the input block data representative of all the pixels of such block.

6. A method of claim 1, 2, or 3 wherein said step of partitioning comprises the substep of overlapping said adjacent input blocks such that the input block data of said each input block representative of the unshared interior pixels of that input block comprise at least approximately 90 percent of the input block data representative of all the pixels of such block.

* * * * *